(12) United States Patent
Kajita

(10) Patent No.: US 7,350,217 B2
(45) Date of Patent: Mar. 25, 2008

(54) METHOD FOR LOADING AND UNLOADING DISK-SHAPED RECORDING MEDIUM AND DISK DRIVE DEVICE

(75) Inventor: Nobuyuki Kajita, Higashihiroshima (JP)

(73) Assignee: Sharp Kabushiki Kaisha, Osaka (JP)

(*) Notice: Subject to any disclaimer, the term of this patent is extended or adjusted under 35 U.S.C. 154(b) by 811 days.

(21) Appl. No.: 10/892,959

(22) Filed: Jul. 16, 2004

(65) Prior Publication Data

US 2005/0015785 A1    Jan. 20, 2005

(30) Foreign Application Priority Data

Jul. 17, 2003  (JP) ............... 2003-198621

(51) Int. Cl.
*G11B 17/04* (2006.01)
(52) U.S. Cl. ..................................... 720/605
(58) Field of Classification Search ................ 720/601, 720/605
See application file for complete search history.

(56) References Cited

U.S. PATENT DOCUMENTS 5,513,157 A * 4/1996 Saito et al. ............. 369/30.32
5,608,705 A * 3/1997 Tanaka ....................... 720/605
5,621,713 A * 4/1997 Sato et al. ................... 720/607
5,742,571 A * 4/1998 Hoshino et al. ......... 369/30.98
6,310,853 B1 * 10/2001 Ito ............................. 720/607

FOREIGN PATENT DOCUMENTS

JP      06-044633      2/1994

* cited by examiner

*Primary Examiner*—A. J. Heinz
*Assistant Examiner*—Mark Blouin
(74) *Attorney, Agent, or Firm*—Morrison & Foerster LLP

(57) ABSTRACT

A disk drive device is arranged so as to swing a traversing mechanism which has an optical pickup and a spindle motor mounted thereon. In a shift mechanism of the optical pickup, its outer end in the radial direction of the optical disk is provided to extend beyond a periphery of the optical disk, and in loading, the optical pickup is caused to withdraw to the outer end which is provided to extend. Therefore, as to the optical pickup which is thicker than the spindle motor and determines the thickness of the whole device, the amount of swing of the pickup is decreased while reliably avoiding the contact between the pickup and the optical disk, thus realizing the reduction in thickness of the device. As a result, it is possible to realize front loading of the optical disk at low cost.

14 Claims, 9 Drawing Sheets

METHOD FOR LOADING AND UNLOADING DISK-SHAPED RECORDING MEDIUM AND DISK DRIVE DEVICE

This Nonprovisional application claims priority under 35 U.S.C. § 119(a) on Patent Application No. 2003/198621 filed in Japan on Jul. 17, 2003, the entire contents of which are hereby incorporated by reference.

FIELD OF THE INVENTION

The present invention relates to a mechanism of a disk drive device suitably used in an optical disk recording and readout apparatus, or the like which performs at least one of recording and readout of a disk-shaped recording medium such as an optical disk, relates to a method for loading and unloading the recording medium in the disk drive device, and particularly relates to a so-called front-loading type disk drive device of loading and unloading the recording medium through a loading slot in a plane direction of the recording medium.

BACKGROUND OF THE INVENTION

FIG. 10 is a plan view illustrating a structure of a typical, conventional disk drive device 1 of the front-loading type. FIGS. 11(a)-11(c) are longitudinal sectional views illustrating the operations of the disk drive device 1. This disk drive device 1 primarily includes a disk transport mechanism 3 which transports an optical disk 2 from/to the inside of the disk drive device 1 to/from the outside of the disk drive device 1, a traversing mechanism 4 that will be described later, and a clamp mechanism 5. The optical disk 2 is DVD (Digital Versatile Disc) and CD (Compact Disc), for example.

FIG. 10 and FIG. 11(a) show a state in which the optical disk 2 is held so as to be rotatable (recordable and readable) inside the disk drive device 1. Information on the recording surface of the optical disk 2 is recorded and reproduced in the following sequential manner: the optical disk 2 is placed on a turntable 6 and sandwiched between the turntable 6 and the clamp mechanism 5 moving in concert at a predetermined recording/readout position, and then, the turntable 6 is rotated by a spindle motor 7, and the guide mechanism 8 moves an optical pickup 9 substantially in the radial direction of the optical disk 2 while bringing the optical pickup 9 closer to the recording surface of the optical disk 2.

The clamp mechanism 5 includes a clamper 5a and a stopper 5b. The clamper 5a includes: a clamp section 5c which sandwiches the optical disk 2 with the turntable 6 by magnetic absorption or the like; a connector section 5d connected to the clamp section 5c and having a small diameter; and a flange section 5e connected to the connector section 5d and having a large diameter. Meanwhile, the stopper 5b is provided with a hole 5f in which the connector section 5d moves freely. Therefore, as will be described later, depending upon the level of the optical disk 2 and the turntable 6, the optical disk 2 is clamped rotatably on the turntable 6 or is removed for loading and unloading operations.

In FIG. 10 and FIGS. 11(a)-11(c), the disk transport mechanism 3 is only represented by a tray. However, as will be described later, as illustrated in FIGS. 11(b) and 11(c), the disk transport mechanism 3 transports the optical disk 2 by horizontally moving the optical disk 2 placed on the tray from/to the recording/readout position illustrated in FIG. 11(a) to/from a loading slot 11 of a device main body 10.

Further, the traversing mechanism 4 includes: the turntable 6; the spindle motor 7 which rotates and drives the turntable 6; the guide mechanism 8; the optical pickup 9, provided on the guide mechanism 8, which is moved by the guide mechanism 8, a frame 12 having these components mounted thereon, and a drive source (not shown) which swings the frame 12. The frame 12 has a base end section extending outwardly beyond an outer diameter of the optical disk 2 and is supported so as to swing freely by an axis 12a which is parallel to the optical disk 2 and is orthogonal to a loading/unloading direction 13 of the optical disk 2. The frame 12 has the guide mechanism 8 and the pickup 9 provided to extend from the base end section of the frame 12, and the frame 12 has the spindle motor 7 which supports the turntable 6, provided at a free end section of the frame 12.

Therefore, when the frame 12 is risen by the drive source not shown, it goes into a recording/readout state illustrated in FIG. 11(a) where the turntable 6 lifts the disk 2 placed on the tray and the clamper 5a, and the optical disk 2 is sandwiched between the turntable 6 and clamp section 5c of the clamper 5a, thereby bringing about a state in which the optical disk 2 can rotate. On the other hand, in loading/unloading, the frame 12, as illustrated in FIG. 11(b), is lowered in the direction of an arrow 15, and the turntable 6 comes out of a table hole 14 which is provided on the tray. This places the optical disk 2 back on the tray. The clamper 5a is limited to move down by the flange section 5e and is separated from the optical disk 2. In this manner, the optical disk 2 can move in the loading/unloading direction 13.

FIGS. 12 and 13 are plan view and bottom plan view of the traversing mechanism 4, respectively. The guide mechanism 8 includes a rail 8a and a lead screw 8b on which the optical pickup 9 is provided, and a stepping motor 8c which is integral with the lead screw 8b. The optical pickup 9 is provided so as to hang across the rail 8a and the lead screw 8b in a pair. A movement piece 9a corresponding to the rail 8a can slide on the rail 8a. A movement piece 9b corresponding to the lead screw 8b is brought a driving force in the axis line direction of the lead screw 8b when the lead screw 8b is rotated by the stepping motor 8c. A pickup main body 9c containing an optical system, light receiving and emitting element, and others is supported between the movement pieces 9a and 9b.

Referring to FIGS. 11(a)-11(c), the following will describe disk unloading operation of the disk drive device 1 arranged as described above. When the optical disk 2 is needed to be unloaded from the device main body 10, the spindle motor 7 starts a stop operation of its rotation soon, and the optical pickup 9 stops its signal reading/writing operation. Thereafter, the optical pickup 9 is moved by the stepping motor 8c of the traversing mechanism 4 in the center-of-rotation direction of the optical disk 2 (on the inner side in the radial direction of the optical disk 2; on the free end section side of the traversing mechanism 4), and holds in standby at the end-of-movement position close to the spindle motor 7, as illustrated in FIG. 11(a).

Subsequently, the traversing mechanism 4 starts lowering in the direction of the arrow 15, and the turntable 6 and the optical disk 2 also lower. At this moment, the clamper 5a starts lowering together with the optical disk 2 and the spindle motor 7 by adsorptivity of the clamp section 5c with respect to the turntable 6. When the clamper 5a lowers by the length of the connector section 5d, lowering of the clamper 5a is limited by the flange section 5e and the stopper 5b, whereby the clamper 5a terminates a clamp operation and releases the optical disk 2.

The released optical disk 2 still keeps lowering. However, as illustrated in FIG. 11(b), the optical disk 2 is caught by the tray of the disk transport mechanism 3 and held substantially in a horizontal state. The spindle motor 7 further lowers and stops at such a position so as not to interfere with the operation of the disk transport mechanism 3 that will be described later. This position is a position where the optical pickup 9 does not come into contact with the optical disk 2 held in the tray during a disk transport operation. The tray of the disk transport mechanism 3 is transported with the optical disk 2 placed thereon in an unloading direction 13a, as illustrated in FIG. 11(c), by a transport mechanism drive section (not shown).

Substantially reversing the procedure of the above operation, the optical disk 2 is loaded from the outside of the device main body 10 in the direction of an arrow 13b. Thus, for realization of the front loading, the traversing mechanism 4 is swung about the axis 12a as a swing support point to retract from a transport path of the optical disk 2, whereby it is possible to avoid a contact between the optical pickup 9 and the optical disk 2 at low cost, compared to an elevator mechanism.

Here, as another example of the conventional art given is Japanese Laid-Open Patent Application No. 1994/44633 (Tokukaihei 6-44633; published on Feb. 18, 1994). However, this conventional art relates to retraction of a bias unit in a so-called magnetically assisted optical disk device in which a bias coil unit and a writing optical head are used in pair. In most cases, the bias unit is used in such a state so as to substantially come into contact with a disk surface, and its action is basically a parallel movement. Therefore, the retraction by swing of an optical head like the present invention is not described at all. Especially, since optical media such as DVD and CD are recordable and readable only with a non-contact optical head (the foregoing optical pickup 9), only the optical head is retracted while keeping it from contact with a disk, thus realizing the reduction in thickness of the whole device.

In the above-mentioned conventional art, the optical disk 2 must be unloaded after the optical pickup 9 moves close to a position where the spindle motor 7 of the traversing mechanism 4 is mounted (to the end-of-movement position located on the inner side in the radial direction of the optical disk 2). This is because in the event that the optical disk 2 to be loaded and unloaded tilts, the optical pickup 9 which is closer to the turntable 6 on which the optical disk 2 is placed unlikely comes into contact with the optical disk 2. This means that the optical pickup 9 is at the farthest position from the axis 12a, which is an axis of swing of the traversing mechanism 4. Then, upon completion of lowering operation, a distance between the optical pickup 9 and the optical disk 2 maximizes, thus reliably avoiding the contact between the optical pickup 9 and the optical disk 2 at the time of loading and unloading of the optical disk 2.

However, in the above-mentioned disk drive device 1, to increase a distance between the optical pickup 9 and the optical disk 2 when lowering so as to reliably avoid the contact between the optical pickup 9 and the optical disk 2, the optical pickup 9 must be moved on the turntable 6 side which is on the free end section side of swing as described above. This arrangement maximizes the amount of swing of the optical pickup 9. However, generally the optical pickup 9 is greater in thickness than the combination of the turntable 6 and the spindle motor 7 which rotates the turntable 6, so that the optical pickup 9 is provided on the outer side of the spindle motor 7 in the radial direction of the optical disk 2, i.e. the optical pickup 9 is provided on the swing support point side. The thickness of the optical pickup 9 poses limitations to a thickness H1 of the whole device.

To reduce the thickness H1, the use of a thin optical pickup may be contemplated. However, the thin optical pickup is not usually used because it generally costs high, and the cost of the optical pickup makes up a high proportion of a total cost of the drive device. Meanwhile, a thin, wall-mount apparatus which is a flat and large monitor combined with periphery devices such as DVD, CD, amplifier, speaker, HDD, and tuner has recently become mainstream. Similarly, as to a disk drive device, a smaller thickness thereof becomes more important than a smaller occupied area thereof.

SUMMARY OF THE INVENTION

An object of the present invention is to provide a method for loading and unloading a disk-shaped recording medium and a disk drive device which realizes reduction in thickness of the disk drive device.

In order to achieve the above object, a method for loading and unloading a disk-shaped recording medium according to the present invention is a method for loading and unloading a disk-shaped recording medium, in which when the recording medium is loaded and unloaded, a pickup falls below a level where the recording medium is placed so that the recording medium is loaded and unloaded in a plane direction thereof while avoiding a contact between the recording medium and the pickup, and a mechanism block having the pickup mounted thereon has a free end section located on a turntable side and a base end section located upstream in an unloading direction of the recording medium, wherein when the recording medium is loaded and unloaded, the free end section moves at a distance about the base end section as a swing support point in a thickness direction of the recording medium, thereby realizing the falling, the mechanism block having a guide mechanism which guides the pickup substantially in a radial direction of the recording medium to realize recording/readout, provided thereon such that a path of the pickup is parallel to a loading/unloading direction of the recording medium and such that its outer end in the radial direction of the recording medium is provided to extend beyond a periphery of the recording medium, the method comprising:

when the recording medium is loaded and unloaded, causing the pickup to withdraw to the outer end which is provided to extend.

According to the foregoing arrangement, in a method for loading and unloading a disk-shaped recording medium which is implemented in a so-called front-loading type optical disk recording and readout apparatus which performs at least one of recording and readout of an optical disk and performs loading and unloading of the optical disk through a loading slot in a plane direction of the optical disk, and realizes the falling by swinging the mechanism block having at least the pickup mounted thereon (in many cases, having the pickup and a turntable together mounted thereon) so that the recording medium can move in a plane direction thereof for realization of the front loading, the mechanism block has a free end section located on a turntable side and has a base end section located upstream in an unloading direction of the recording medium, and when the recording medium is loaded and unloaded, the free end section moves at a distance about the base end section as a swing support point in a thickness direction of the recording medium, thereby withdrawing the pickup (or the pickup and the turntable if they are mounted together on the mechanism block) from a traveling area of the recording medium. This avoids the contact between the pickup and the recording medium at low cost.

However, in such an arrangement, to increase a distance between the pickup and the recording medium so as to reliably avoid the contact between the pickup and the recording medium, the pickup must be moved on the turntable side which is on the free end section side of swing. This arrangement maximizes the amount of swing of the pickup. However, the pickup is generally greater in thickness than the combination of the turntable and a spindle motor which rotates the turntable, so that the pickup is provided on the outer side of the spindle motor in the radial direction of the recording medium. The thickness of the pickup poses limitations to the thickness of the whole device.

In view of this, in the present invention, the guide mechanism is provided on the mechanism block such that a path of the pickup is parallel to the loading/unloading direction of the recording medium and such that its outer end in the radial direction of the recording medium is provided to extend beyond a periphery of the recording medium, and when the recording medium is loaded and unloaded, the pickup is caused to withdraw to the outer end which is provided to extend.

Therefore, even with a small amount of fall of a tip of the pickup from a level where the recording medium is placed, the contact between the tip of the pickup and the recording medium under loading/unloading is reliably avoided, thus preventing damage to the pickup, and the amount of swing of the pickup, which is thicker than the spindle motor, is decreased, thus realizing the reduction in thickness of the whole device.

Further, a method for loading and unloading a disk-shaped recording medium of the present invention is a method for loading and unloading a disk-shaped recording medium, in which when the recording medium is loaded and unloaded, a pickup falls below a level where the recording medium is placed so that the recording medium is loaded and unloaded in a plane direction thereof while avoiding a contact between the recording medium and the pickup, and a mechanism block having the pickup mounted thereon has a free end section located on a turntable side and a base end section located upstream in an unloading direction of the recording medium from a diameter line of the recording medium placed at the recording/readout position, the diameter line being orthogonal to the unloading direction, wherein when the recording medium is loaded and unloaded, the free end section moves at a distance about the base end section as a swing support point in a thickness direction of the recording medium, thereby realizing the falling, the mechanism block having a guide mechanism which guides the pickup substantially in a radial direction of the recording medium to realize recording/readout, provided thereon such that a path of the pickup is within an area upstream in the unloading direction from the diameter line and such that its outer end in the radial direction of the recording medium is provided to extend beyond a periphery of the recording medium, the method comprising:

when the recording medium is loaded and unloaded, causing the pickup to withdraw to the outer end which is provided to extend.

According to the foregoing arrangement, in a method for loading and unloading a disk-shaped recording medium which is implemented in a so-called front-loading type optical disk recording and readout apparatus which performs at least one of recording and readout of an optical disk and performs loading and unloading of the optical disk through a loading slot in a plane direction of the optical disk, and realizes the falling by swinging the mechanism block having at least the pickup mounted thereon (in many cases, having the pickup and a turntable together mounted thereon) so that the recording medium can move in a plane direction thereof for realization of the front loading, the mechanism block has a free end section located on a turntable side and a base end section located upstream in an unloading direction of the recording medium from a diameter line of the recording medium placed at the recording/readout position, the diameter line being orthogonal to the unloading direction, and when the recording medium is loaded and unloaded, the free end section moves at a distance about the base end section as a swing support point in a thickness direction of the recording medium, thereby withdrawing the pickup (or the pickup and the turntable if they are mounted together on the mechanism block) from a traveling area of the recording medium. This avoids the contact between the pickup and the recording medium at low cost.

However, in such an arrangement, to increase a distance between the pickup and the recording medium so as to reliably avoid the contact between the pickup and the recording medium, the pickup must be moved on the turntable side which is on the free end section side of swing. This arrangement maximizes the amount of swing of the pickup. However, the pickup is generally greater in thickness than the combination of the turntable and a spindle motor which rotates the turntable, so that the pickup is provided on the outer side of the spindle motor in the radial direction of the recording medium. The thickness of the pickup poses limitations to the thickness of the whole device.

In view of this, in the present invention, the guide mechanism is provided on the mechanism block such that a path of the pickup is within an area upstream in the unloading direction from the diameter line and such that its outer end in the radial direction of the recording medium is provided to extend beyond a periphery of the recording medium, and when the recording medium is loaded and unloaded, the pickup is caused to withdraw to the outer end which is provided to extend.

Therefore, even with a small amount of fall of a tip of the pickup from a level where the recording medium is placed, the contact between the tip of the pickup and the recording medium under loading/unloading is reliably avoided, thus preventing damage to the pickup, and the amount of swing of the pickup, which is thicker than the spindle motor, is decreased, thus realizing the reduction in thickness of the whole device.

Still further, a disk drive device of the present invention is a disk drive device, in which when a disk-shaped recording medium is loaded and unloaded, a pickup falls below a level where the recording medium is placed so that the recording medium is loaded and unloaded in a plane direction thereof while avoiding a contact between the recording medium and the pickup, and a mechanism block having the pickup mounted thereon has a free end section located on a turntable side and a base end section located upstream in an unloading direction of the recording medium, wherein when the recording medium is loaded and unloaded, the free end section moves at a distance about the base end section as a swing support point in a thickness direction of the recording medium, thereby realizing the falling, the disk drive device comprising:

a guide mechanism which guides the pickup substantially in a radial direction of the recording medium to realize recording/readout, the guide mechanism being provided on the mechanism block such that a path of the pickup is parallel to a loading/unloading direction of the recording medium and such that its outer end in the radial direction of the recording medium is provided to extend beyond a periphery of the recording medium; and a control section which, when the recording medium is loaded and unloaded, actuates the mechanism block and controls the guide mechanism so as to cause the pickup to withdraw to the outer end which is provided to extend.

According to the foregoing arrangement, in a disk drive device which is implemented as a so-called front-loading type optical disk recording and readout apparatus and realizes the falling by swinging the mechanism block having at least the pickup mounted thereon so that the recording medium can move in a plane direction thereof for realization of the front loading, the mechanism block has a free end section located on a turntable side and has a base end section located upstream in an unloading direction of the recording medium, and when the recording medium is loaded and unloaded, the free end section moves at a distance about the base end section as a swing support point in a thickness direction of the recording medium, thereby withdrawing the pickup from a traveling area of the recording medium. This avoids the contact between the pickup and the recording medium at low cost.

However, in such an arrangement, to increase a distance between the pickup and the recording medium so as to reliably avoid the contact between the pickup and the recording medium, the pickup must be moved on the turntable side which is on the free end section side of swing. This arrangement maximizes the amount of swing of the pickup. However, the pickup is generally greater in thickness than the combination of the turntable and a spindle motor which rotates the turntable, so that the pickup is provided on the outer side of the spindle motor in the radial direction of the recording medium, i.e. on the swing support point side. The thickness of the pickup poses limitations to the thickness of the whole device.

In view of this, in the present invention, the guide mechanism is provided on the mechanism block such that a path of the pickup is parallel to the loading/unloading direction of the recording medium and such that its outer end in the radial direction of the recording medium is provided to extend beyond a periphery of the recording medium, and a control section is provided to actuate the mechanism block and control the guide mechanism when the recording medium is loaded and unloaded, so as to cause the pickup to withdraw to the outer end which is provided to extend.

Therefore, even with a small amount of fall of a tip of the pickup from a level where the recording medium is placed, the contact between the tip of the pickup and the recording medium under loading/unloading is reliably avoided, thus preventing damage to the pickup, and the amount of swing of the pickup, which is thicker than the spindle motor, is decreased, thus realizing the reduction in thickness of the whole device.

Further, a disk drive device of the present invention is a disk drive device, in which when a disk-shaped recording medium is loaded and unloaded, a pickup falls below a level where the recording medium is placed so that the recording medium is loaded and unloaded in a plane direction thereof while avoiding a contact between the recording medium and the pickup, and a mechanism block having the pickup mounted thereon has a free end section located on a turntable side and a base end section located upstream in an unloading direction of the recording medium from a diameter line of the recording medium placed at the recording/readout position, the diameter line being orthogonal to the unloading direction, wherein when the recording medium is loaded and unloaded, the free end section moves at a distance about the base end section as a swing support point in a thickness direction of the recording medium, thereby realizing the falling, the disk drive device comprising:

a guide mechanism which guides the pickup substantially in a radial direction of the recording medium to realize recording/readout, the guide mechanism being provided on the mechanism block such that a path of the pickup is within an area upstream in the unloading direction from the diameter line and such that its outer end in the radial direction of the recording medium is provided to extend beyond a periphery of the recording medium; and a control section which, when the recording medium is loaded and unloaded, actuates the mechanism block and controls the guide mechanism so as to cause the pickup to withdraw to the outer end which is provided to extend.

According to the foregoing arrangement, in a disk drive device which is implemented as a so-called front-loading type optical disk recording and readout apparatus and realizes the falling by swinging the mechanism block having at least the pickup mounted thereon so that the recording medium can move in a plane direction thereof for realization of the front loading, the mechanism block has a free end section located on a turntable side and a base end section located upstream in an unloading direction of the recording medium from a diameter line of the recording medium placed at the recording/readout position, the diameter line being orthogonal to the unloading direction, and when the recording medium is loaded and unloaded, the free end section moves at a distance about the base end section as a swing support point in a thickness direction of the recording medium, thereby withdrawing the pickup from a traveling area of the recording medium. This avoids the contact between the pickup and the recording medium at low cost.

However, in such an arrangement, to increase a distance between the pickup and the recording medium so as to reliably avoid the contact between the pickup and the recording medium, the pickup must be moved on the turntable side which is on the free end section side of swing. This arrangement maximizes the amount of swing of the pickup. However, the pickup is generally greater in thickness than the combination of the turntable and a spindle motor which rotates the turntable, so that the pickup is provided on the outer side of the spindle motor in the radial direction of the recording medium, i.e. on the swing support point side. The thickness of the pickup poses limitations to the thickness of the whole device.

In view of this, in the present invention, the guide mechanism is provided such that a path of the pickup is within an area upstream in the unloading direction from the diameter line and such that its outer end in the radial direction of the recording medium is provided to extend beyond a periphery of the recording medium, and a control section is provided to actuate the mechanism block and control the guide mechanism when the recording medium is loaded and unloaded, so as to cause the pickup to withdraw to the outer end which is provided to extend.

Therefore, even with a small amount of fall of a tip of the pickup from a level where the recording medium is placed, the contact between the tip of the pickup and the recording medium under loading/unloading is reliably avoided, thus preventing damage to the pickup, and the amount of swing of the pickup, which is thicker than the spindle motor, is decreased, thus realizing the reduction in thickness of the whole device.

Still further, a disk drive device of the present invention is a disk drive device in which a disk-shaped recording medium is rotated by a turntable, and a guide mechanism moves a pickup substantially in a radial direction of the recording medium while bringing the pickup closer to the recording surface of the recording medium, thereby sequentially recording/reproducing information on a recording surface of the disk-shaped recording medium, wherein:

the guide mechanism is provided such that a path of the pickup is within an area upstream in an unloading direction of the recording medium from a diameter line of the recording medium placed at the recording/readout position, the diameter line being orthogonal to the unloading direction, and such that its outer end in the radial direction of the recording medium is provided to extend beyond a periphery of the recording medium, and included is a control section which, when the recording medium is loaded and unloaded, controls the guide mechanism so as to cause the pickup to withdraw to the outer end which is provided to extend.

According to the foregoing arrangement, in a disk drive device which performs at least one of recording and readout of an optical disk, the guide mechanism is provided such that a path of the pickup is within an area upstream in the unloading direction from the diameter line, the diameter line being orthogonal to the unloading direction, and such that its outer end in the radial direction of the recording medium is provided to extend beyond a periphery of the recording medium. Then, when the recording medium is loaded and unloaded, the control section controls the guide mechanism so as to withdraw the pickup to the outer end which is provided to extend.

Therefore, the contact between the tip of the pickup and the recording medium under loading/unloading is reliably avoided, thus preventing damage to the pickup. In addition, for avoidance of the contract between the pickup and the recording medium, it is not necessary to move the pickup in the thickness direction of the recording medium, thus realizing the reduction in thickness of the apparatus. Further, a mechanism which performs a movement operation is reduced in size, thus realizing simplification of the mechanism, cost reduction, and enhancement of reliability.

Further, in the disk drive device of the present invention, in response to an external request for unloading the recording medium, the control section simultaneously performs an operation of slowing down and stopping a spindle motor which rotates the turntable and an operation of causing the guide mechanism to withdraw the pickup, thereafter causing a transport mechanism to unload the recording medium.

According to the foregoing arrangement, the withdraw of the pickup is performed simultaneously with the slow-down operation, not after the spindle motor stops. This shortens a time required for the withdraw of the pickup, thus allows a quick shift to the unloading operation of the recording medium, resulting in shortening of unloading time.

Still further, in a disk drive device of the present invention, a cleaning section of the pickup is provided on the outer end of the guide mechanism which is provided to extend.

According to the foregoing arrangement, providing the cleaning section such as a cleaner enables to make good use of an area which becomes newly necessary for withdraw of the pickup in the present invention to avoid the contact between the pickup and the recording medium.

Further, in a disk drive device of the present invention, in response to an external request for unloading the recording medium, the control section stops a spindle motor which rotates the turntable and causes the guide mechanism to withdraw the pickup, thereafter causing a transport mechanism to unload the recording medium and causing the cleaning section to clean the pickup.

According to the foregoing arrangement, cleaning of the pickup is performed by the cleaning section at the same time when the transport mechanism starts the unloading operation of the recording medium. This makes it possible to put forward a cleaning stop time and complete cleaning before loading of the subsequent recording medium, or to perform an early reading/writing of the subsequent recording medium, if the cleaning is not completed.

For a fuller understanding of the nature and advantages of the invention, reference should be made to the ensuing detailed description taken in conjunction with the accompanying drawings.

DESCRIPTION OF THE EMBODIMENTS

The following will describe the first embodiment of the present invention with reference to FIGS. 1 through 4.

Figure 1:
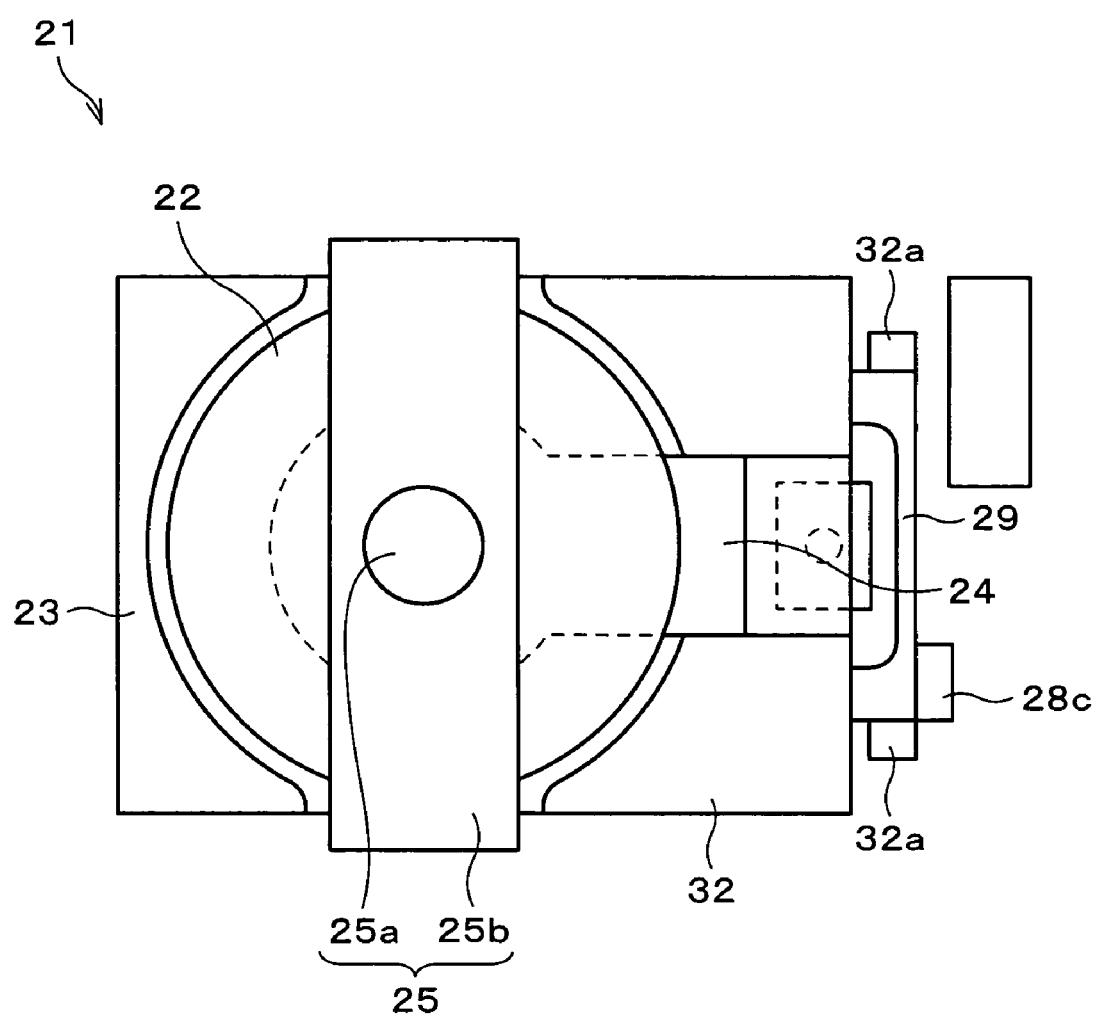
FIG. 1 is a plan view illustrating a structure of a disk drive device of the first embodiment of the present invention.

FIG. 1 is a plan view illustrating a structure of a disk drive device 21 of the first embodiment of the present invention, and FIGS. 2(a) and 2(b) are longitudinal sectional views illustrating the operations of the disk drive device 21. This disk drive device 21 primarily includes a disk transport mechanism 23 which transports an optical disk 22 from/to the inside of the disk drive device 21 to/from the outside of the disk drive device 21, a traversing mechanism 24 that will be described later, and a clamp mechanism 25. The optical disk 22 is DVD (Digital Versatile Disc) and CD (Compact Disc), for example.

FIG. 1 and FIG. 2(a) show a state in which the optical disk 22 is held so as to be rotatable (recordable and readable) inside the disk drive device 21. Information on the recording surface of the optical disk 22 is recorded and reproduced in the following sequential manner: the optical disk 22 is placed on a turntable 26 and sandwiched between the turntable 26 and the clamp mechanism 25 moving in concert at a predetermined recording/readout position, and then, the turntable 26 is rotated by a spindle motor 27, and the guide mechanism 28 moves an optical pickup 29 substantially in the radial direction of the optical disk 22 while bringing the optical pickup 29 closer to the recording surface of the optical disk 22.

The clamp mechanism 25 includes a clamper 25a and a stopper 25b. The clamper 25a includes: a clamp section 25c which sandwiches the optical disk 22 with the turntable 26 by magnetic absorption or the like; a connector section 25d connected to the clamp section 25c and having a small diameter; and a flange section 25e connected to the connector section 5d and having a large diameter. Meanwhile, the stopper 25b is provided with a hole 25f in which the connector section 25d moves freely. Therefore, as will be described later, depending upon the level of the optical disk 22 and the turntable 26, the optical disk 22 is clamped rotatably on the turntable 26 or is released for loading and unloading operations.

In FIG. 1 and FIGS. 2(a)-2(c), the disk transport mechanism 23 is only represented by a tray. However, as will be described later, as illustrated in FIGS. 2(b), the disk transport mechanism 23 transports the optical disk 22 by horizontally moving the optical disk 2 placed on the tray from/to the recording/readout position illustrated in FIG. 2(a) to/from a loading slot of a device main body.

Further, the traversing mechanism 24 includes: the turntable 26; the spindle motor 27 which rotates the turntable 26; the guide mechanism 28; the optical pickup 29, provided on the guide mechanism 28, which is moved by actuation of the guide mechanism 28, a frame 32 having these components mounted thereon, and a drive source (not shown) which swings the frame 32. The frame 32 has a base end section extending outwardly with respect to an outer diameter of the disk 22 and is supported so as to swing freely by an axis 32a which is parallel to the optical disk 22 and is orthogonal to a loading/unloading direction 33 of the optical disk 22. The frame 32 has the guide mechanism 28 and the pickup 29 provided to extend from the base end section of the frame 32, and has the spindle motor 27 which supports the turntable 26, provided at a free end section of the frame 32.

Therefore, when the frame 32 is risen by the drive source not shown, it goes into a recording/readout state illustrated in FIG. 2(a) where the turntable 26 lifts the optical disk 22 placed on the tray and the clamper 25a, and the optical disk 22 is sandwiched between the turntable 26 and clamp section 25c of the clamper 25a, thereby bringing about a state in which the optical disk 22 can rotate. On the other hand, in loading/unloading, the frame 32, as illustrated in FIG. 2(b), is lowered in the direction of an arrow 34, and the turntable 26 comes out of a table hole 35 which is provided on the tray. This places the optical disk 22 back on the tray. The clamper 25a is limited to move down by the flange section 25e and is separated from the optical disk 22. In this manner, the optical disk 22 can move in the loading/unloading direction 33.

Figure 3:
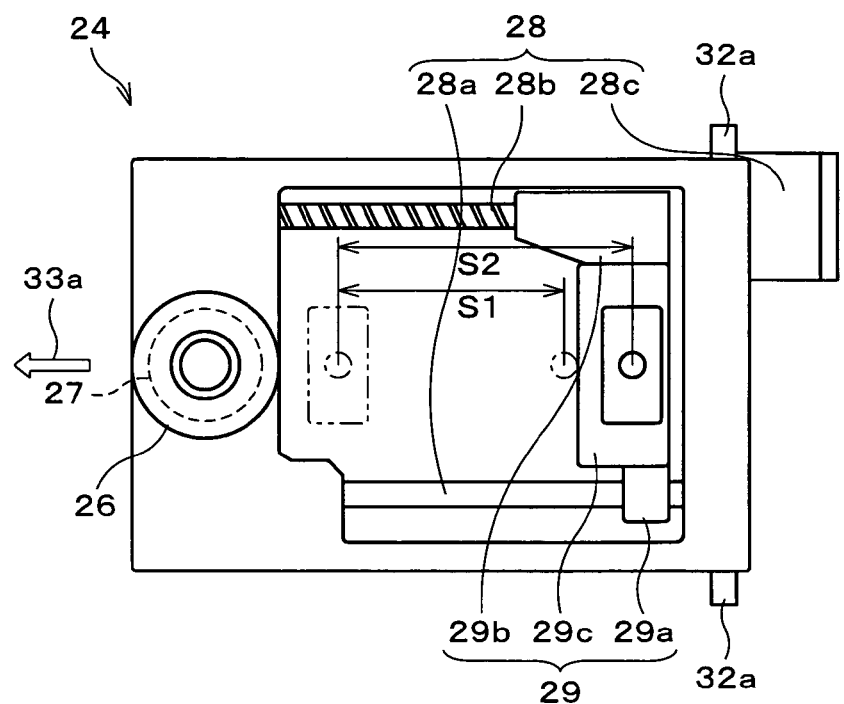
FIG. 3 is a plan view of a traversing mechanism in the disk drive device illustrated in FIG. 1.
Figure 4:
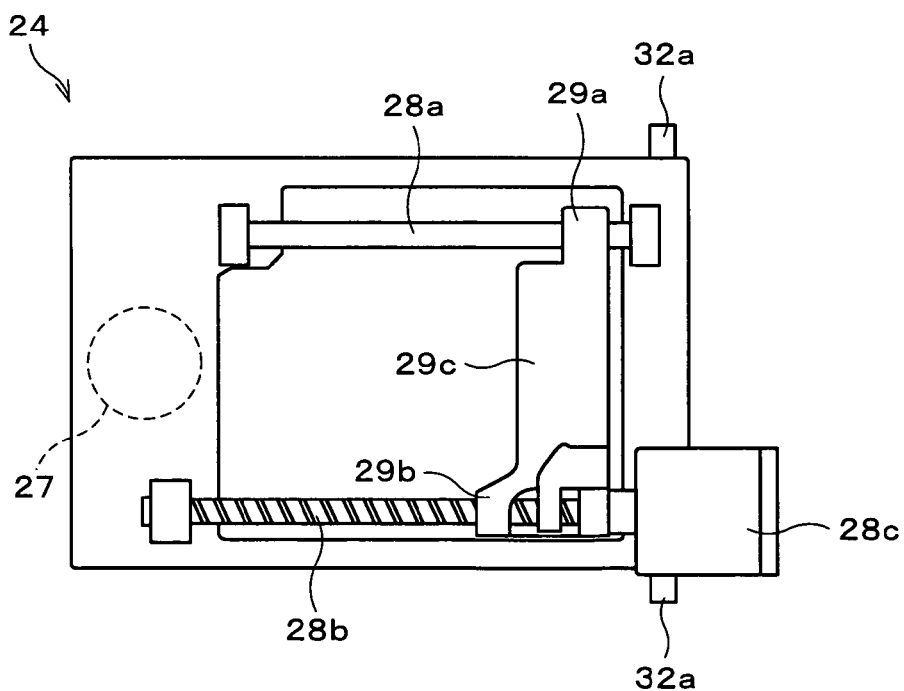
FIG. 4 is a bottom plan view of a traversing mechanism in the disk drive device illustrated in FIG. 1.

FIGS. 3 and 4 are plan view and bottom plan view of the traversing mechanism 24, respectively. The guide mechanism 28 includes a rail 28a and a lead screw 28b on which the optical pickup 29 is provided, and a stepping motor 28c which is integral with the lead screw 28b. The optical pickup 29 is provided so as to hang across the rail 28a and the lead screw 28b in a pair. A movement piece 29a corresponding to the rail 28a can slide on the rail 28a. A movement piece 29b corresponding to the lead screw 28b is brought a driving force in the axis line direction of the lead screw 28b when the lead screw 28b is rotated by the stepping motor 28c. A pickup main body 29c containing an optical system, light receiving and emitting element, and others is supported between the movement pieces 29a and 29b.

The foregoing arrangement is the same as the disk drive device 1 illustrated in FIGS. 10 through 13. Note that, in this disk drive device 21, the guide mechanism 28 is provided to extend beyond a periphery of the optical disk 22 in the opposite direction to an unloading direction 33a of the optical disk 22. In addition, in loading and unloading the optical disk 22, the guide mechanism 28 is controlled by control means (not shown), and as illustrated in FIGS. 2(a) and 4, after the optical pickup 29 is withdrawn to the outer end of the guide mechanism 28, which is provided to extend, the traversing mechanism 24 is lowered as illustrated in FIGS. 2(a) and 2(b). In other words, the guide mechanism 28 is extended such that in loading and unloading the optical disk 22, as illustrated in FIG. 3, the amount of shift in this disk drive device 21, represented by reference numeral S2, is greater than the amount of shift of the optical pickup 29, represented by reference numeral S1, in the foregoing disk drive device 1.

Figure 2:
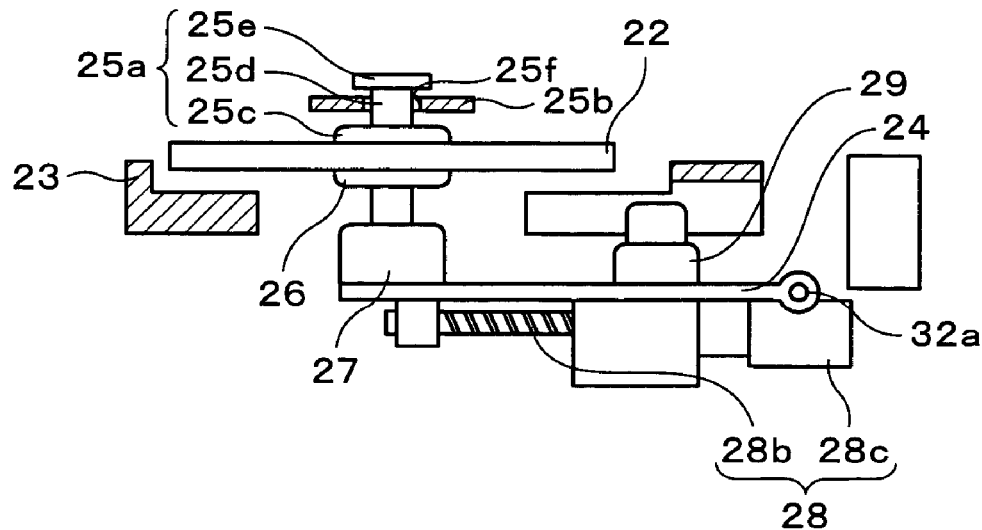
FIGS. 2(a) and 2(b) are longitudinal sectional views illustrating the operations of the disk drive device illustrated in FIG. 1.
Figure 2:
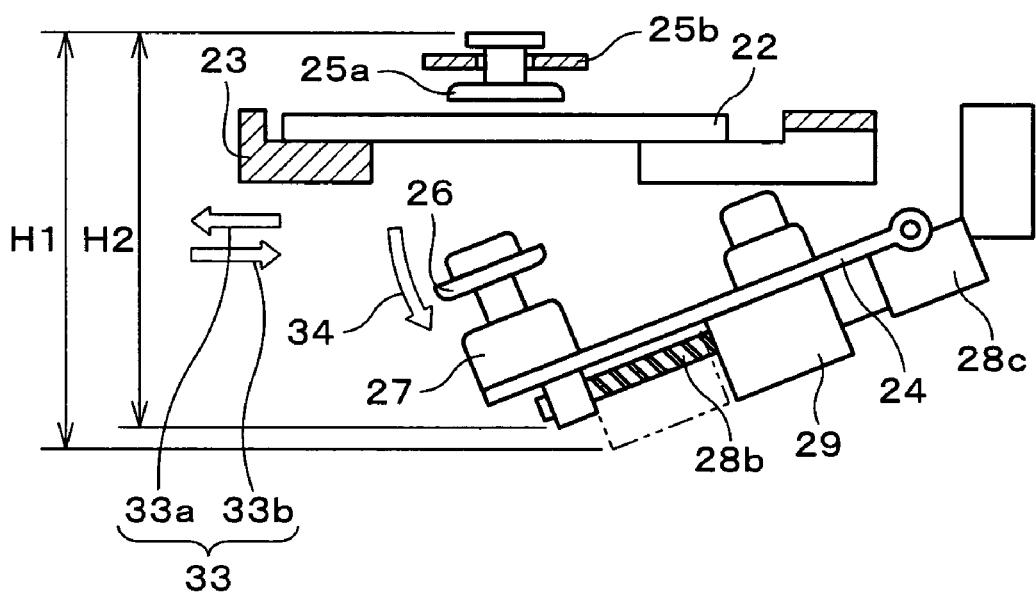

Referring to FIGS. 2(a) and 2(b), the following will describe disk unloading operation of the disk drive device 21 arranged as described above. When the optical disk 22 is needed to be unloaded from the device main body, the spindle motor 27 immediately starts a stop operation of its rotation, and the optical pickup 29 stops its signal reading/writing operation. Thereafter, the optical pickup 29 is moved outward in the radial direction of the optical disk 22 by the stepping motor 28c of the traversing mechanism 24, and holds in standby at the end of the traversing mechanism 24 on the base end section side, as illustrated in FIGS. 1 through 4.

Subsequently, the traversing mechanism 24 starts lowering in the direction of the arrow 34, and the turntable 26 and the optical disk 22 also lower. At this moment, the clamper 25a starts lowering together with the optical disk 22 and the spindle motor 27 by adsorptivity of the clamp section 25c with respect to the turntable 26. When the clamper 25a lowers by the length of the connector section 25d, lowering of the clamper 25a is limited by the flange section 25e and the stopper 25b, whereby the clamper 25a terminates a clamp operation and releases the optical disk 22.

The released optical disk 22 still keeps lowering. However, as illustrated in FIG. 2(b), the optical disk 22 is caught by the tray of the disk transport mechanism 23 and held substantially in a horizontal state. The spindle motor 27 further lowers and stops at such a position so as not to interfere with the operation of the disk transport mechanism 23 that will be described later. The tray of the disk transport mechanism 23 is transported with the optical disk 22 placed thereon in the unloading direction 33a by a transport mechanism drive section (not shown).

Substantially reversing the procedure of the above operation, the optical disk 22 is loaded from the outside of the device in the direction of an arrow 33b. Thus, for realization of the front loading, the traversing mechanism 24 is swung about the axis 32a as a swing support point to retract from a transport path of the optical disk 22, whereby it is possible to prevent contact between the optical pickup 29 and the optical disk 22 at low cost, compared to an elevator mechanism.

Further, as described above, the guide mechanism 28 is provided to extend in the opposite direction to the unloading direction 33a, and in loading and unloading the optical disk 22, after the optical pickup 29 is withdrawn to the outer end of the guide mechanism 28, which is provided to extend, the traversing mechanism 24 is lowered, whereby even with a small amount of fall of a tip of the optical pickup 29 from a level where the optical disk 22 is placed, the contact between the tip of the optical pickup 29 and the optical disk 22 under loading/unloading is reliably avoided, thus preventing damage to the optical pickup 29, and the amount of swing of the optical pickup 29 is decreased, thus realizing the reduction in thickness of the whole device from H1 for the foregoing disk drive device 1 to H2 for the disk drive device 21.

Note that, in the foregoing disk drive device 1, the optical pickup 9 holds in standby at the innermost end of the optical disk 2, whereas in the disk drive device 21, the optical pickup 29 hold in standby at the outermost end of the optical disk 22. This might cause a delay of reading of disk status information, which is mainly stored in the innermost end of the optical disk 22, to be carried out immediately after completion of loading, hence a delay of main information reading or operation response of writing.

Conventionally, especially in a readout-only apparatus, a low-price DC motor with gear sequence was often used as drive means of the optical pickup 29. However, since this arrangement generated a slow speed movement, it was not suitable for the arrangement in which the optical pickup 29 holds in standby at the outermost end of the optical disk 22, like the disk drive device 21. In view of this, the foregoing stepping motor 28c with the lead screw 28b which generates a high speed movement come into use. With advances in technological innovations, a low-price stepping motor with a good response has recently become available, so that even with the arrangement of the disk drive device 21, a system configuration of a moderate response can be realized at low cost.

Further, in the disk drive device of the present invention, in response to an external request for unloading the optical disk 22, the control means not shown simultaneously performs the operation of slowing down and stopping the spindle motor 27 which rotates the turntable 26 and the operation of causing the guide mechanism 28 to withdraw the optical pickup 29, thereafter causing the disk transport mechanism 23 to unload the optical disk 22. That is, the withdrawal of the optical pickup 29 is performed simultaneously with the slow-down operation, not after the spindle motor 27 stops. This shortens a time required for the withdrawal of the optical pickup 29, thus allows a quick shift to the unloading operation of the optical disk 22, resulting in shortening of unloading time.

Figure 5:
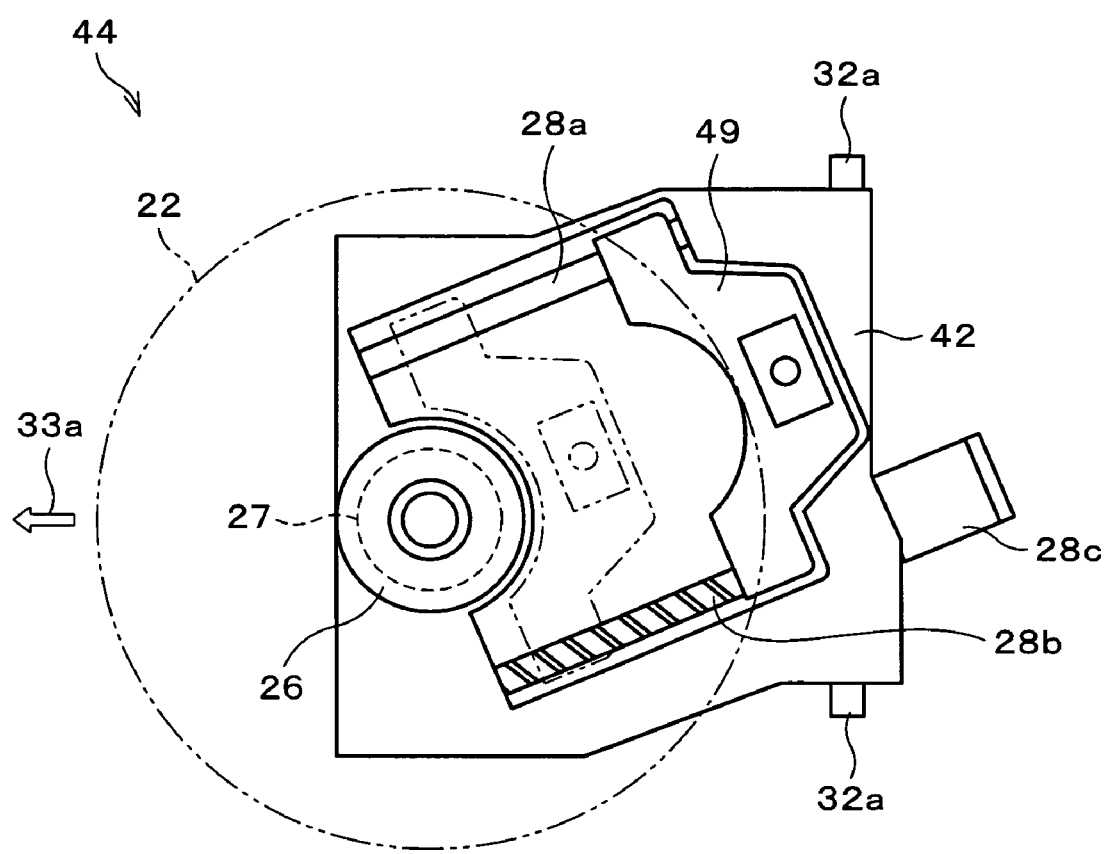
FIG. 5 is a plan view illustrating a structure of a traversing mechanism in a disk drive device of the second embodiment of the present invention.

The following will describe the second embodiment of the present invention with reference to FIG. 5.

FIG. 5 is a plan view illustrating a structure of a traversing mechanism 44 in a disk drive device of the second embodiment of the present invention. This traversing mechanism 44 is similar to the traversing mechanism 24 illustrated in FIG. 3, and members having the same functions as those described in the first embodiment are given the same reference numerals and explanations thereof are omitted here. In the present invention, unlike the optical pickup 29, the withdrawing direction of an optical disk pickup 49 is not necessarily limited to the loading/unloading direction 33 of the optical disk 22. That is, in the foregoing traversing mechanism 24, a direction in which the optical pickup 29 is shifted by the guide mechanism 28 is parallel to the unloading direction 33a, whereas in the traversing mechanism 44, the shift direction of the optical pickup 49 intersects with the unloading direction 33a. Note that, the optical pickup 49 is preferably shifted at an angle of ±90° or more with respect to the unloading direction 33a. This is because, the less the angle is than ±90°, the higher the possibility that a tip of the optical pickup 49 could come into contact with the optical disk 22, thus increasing the length of the guide mechanism 28 to be extended so as to withdraw the optical pickup 49.

Further, as to the traversing mechanism 44, it is not limited that its base end section is located upstream in the unloading direction 33a and that its free end section is located downstream in the unloading direction 33a, which is on the turntable 26 side. The traversing mechanism 44 should be placed in such a position that its free end section is located on the turntable 26 side and that its base end section is located upstream in the unloading direction 33a from a diameter line of the optical disk 22 placed at the recording/readout position, which is orthogonal to the unloading direction 33a.

Figure 6:
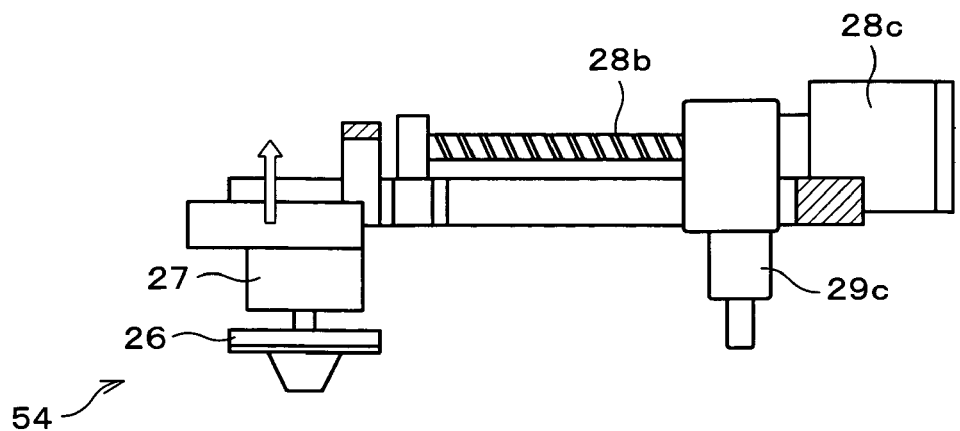
FIG. 6 is a longitudinal sectional view illustrating a structure of a traversing mechanism in a disk drive device of the third embodiment of the present invention.
Figure 7:
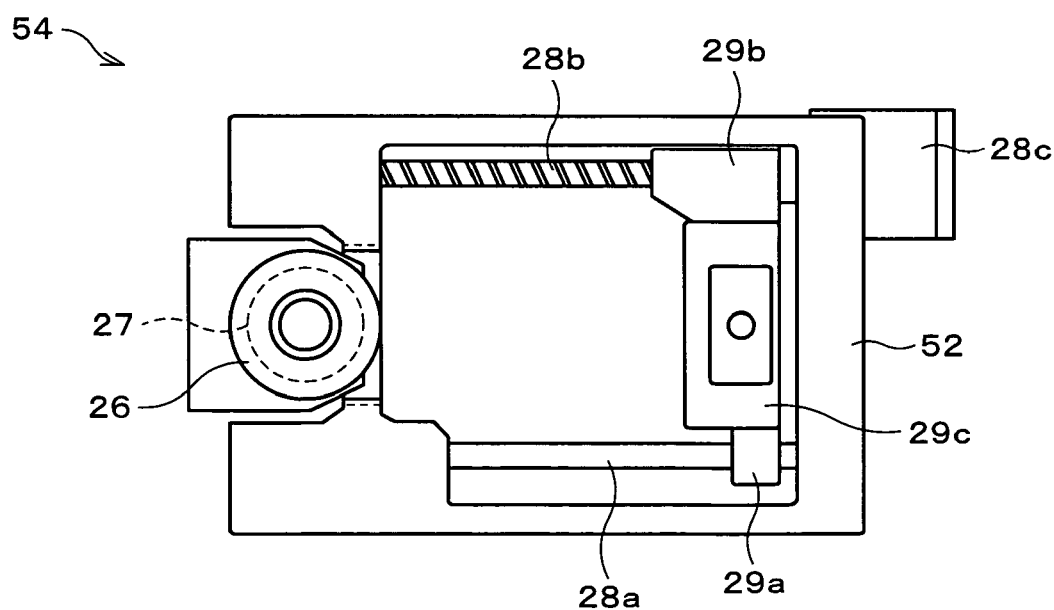
FIG. 7 is a plan view of a traversing mechanism in the disk drive device illustrated in FIG. 6.

The following will describe the third embodiment of the present invention with reference to FIGS. 6 and 7.

FIG. 6 is a longitudinal sectional view illustrating a structure of a traversing mechanism 54 in a disk drive device of the third embodiment of the present invention, and FIG. 7 is a plan view thereof. This traversing mechanism 54 is similar to the traversing mechanism 24 illustrated in FIGS. 2(a) and 2(b) and FIG. 3, and members having the same functions as those described in the first and second embodiments are given the same reference numerals and explanations thereof are omitted here. Note that, in the traversing mechanism 54, a spindle motor section which is made up of the turntable 27 and the spindle motor 27 is separated from the traversing mechanism 54, and in transporting the optical disk 22, only the spindle motor section is lowered by a spindle hoisting and lowering mechanism not shown.

As described previously, if the guide mechanism 28 is provided to extend beyond a periphery of the optical disk 22 in the opposite direction to an unloading direction 33a of the optical disk 22, only the spindle motor section interferes with disk loading/unloading. That is why the spindle motor section is separated from the traversing mechanism 54. With such an arrangement, the spindle hoisting and lowering mechanism actuates only the spindle motor section of which weight is lighter than the weight of the whole traversing mechanism 54. This realizes simplified mechanism, cost reduction, reduction in thickness of the apparatus, and enhancement of reliability.

Figure 8:
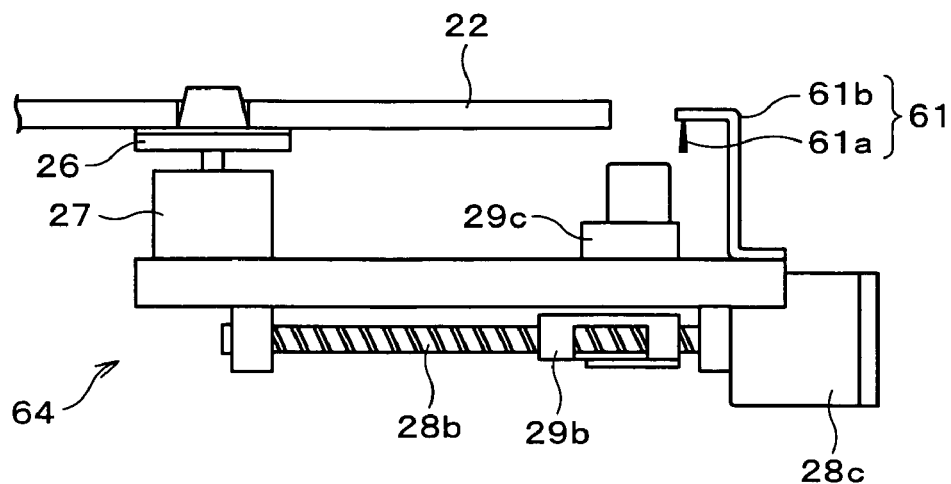
FIG. 8 is a longitudinal sectional view illustrating a structure of a traversing mechanism in a disk drive device of the fourth embodiment of the present invention.
Figure 9:
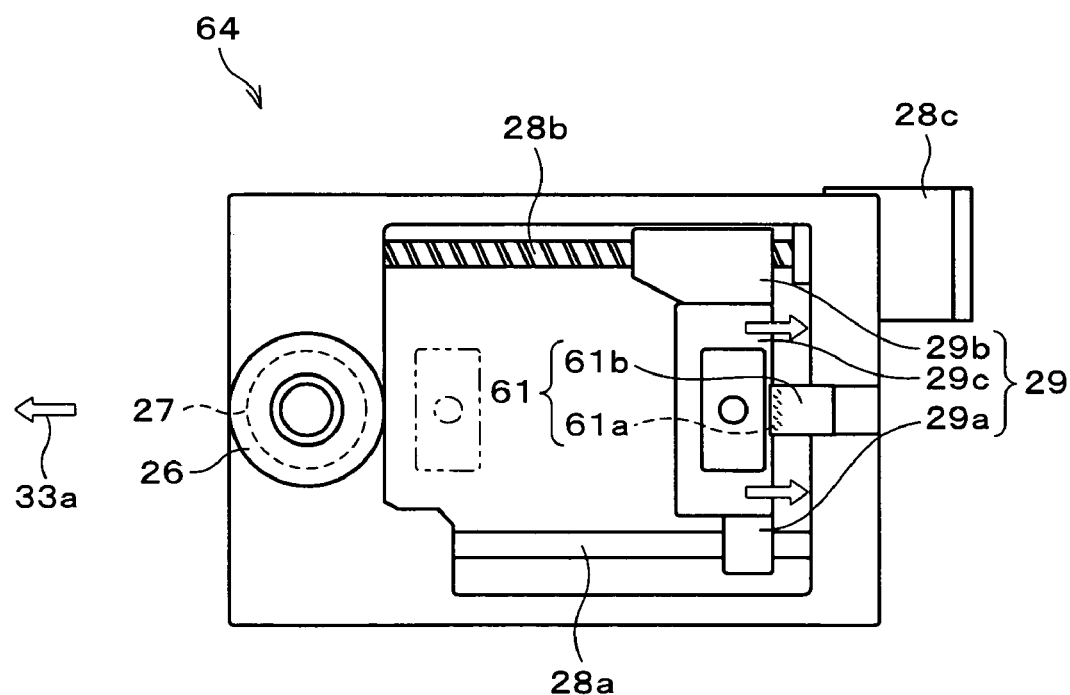
FIG. 9 is a plan view of a traversing mechanism in the disk drive device illustrated in FIG. 8.
Figure 10:
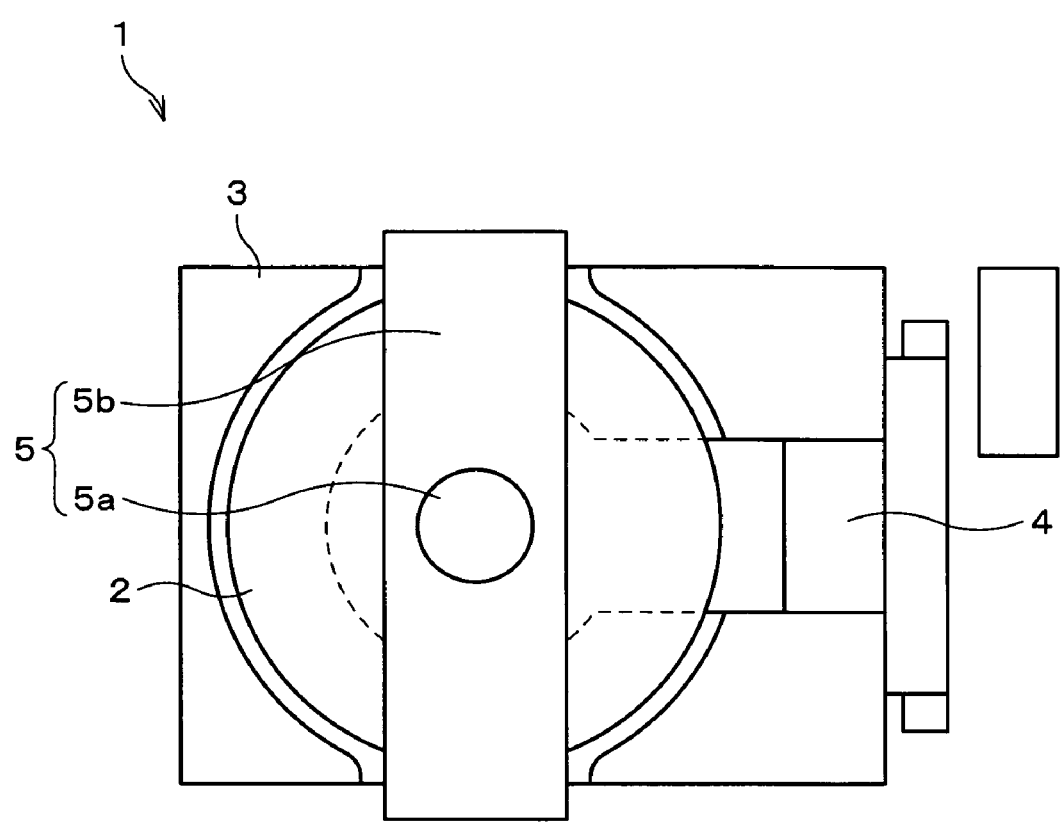
FIG. 10 is a plan view illustrating a structure of a conventional disk drive device.
Figure 11:
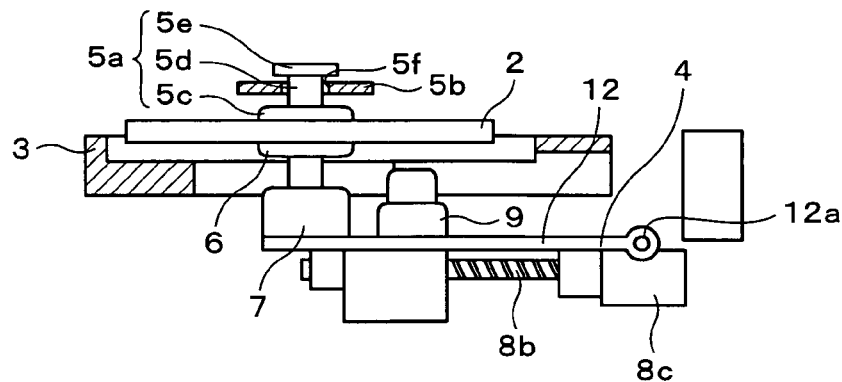
FIGS. 11(a)-11(c) are longitudinal sectional views illustrating the operations of the disk drive device illustrated in FIG. 10.
Figure 11:
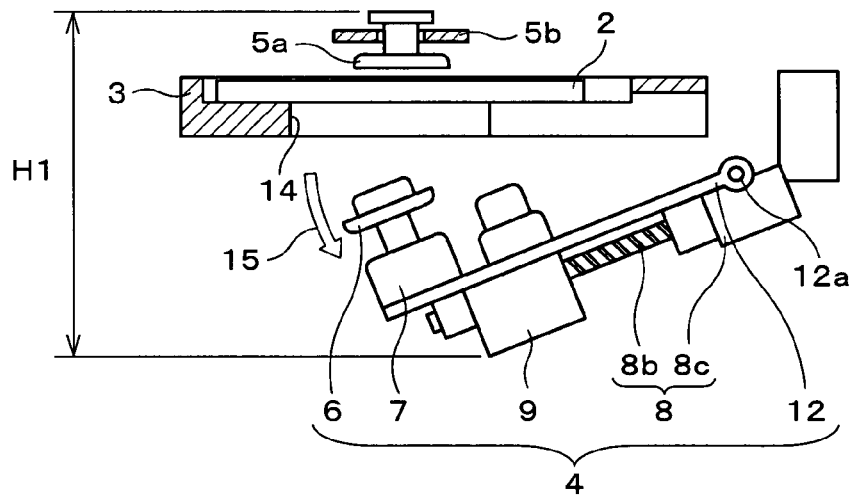
Figure 11:
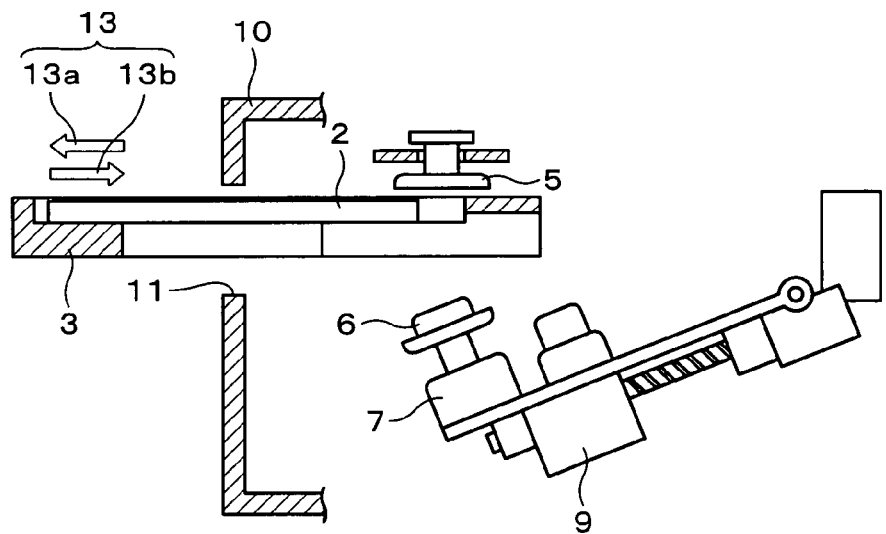
Figure 12:
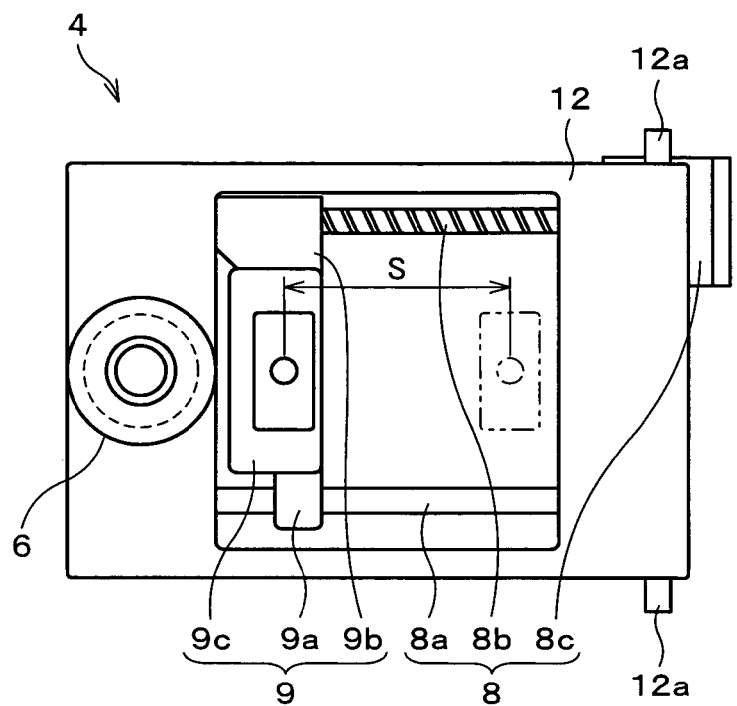
FIG. 12 is a plan view of a traversing mechanism in the disk drive device illustrated in FIG. 10.
Figure 13:
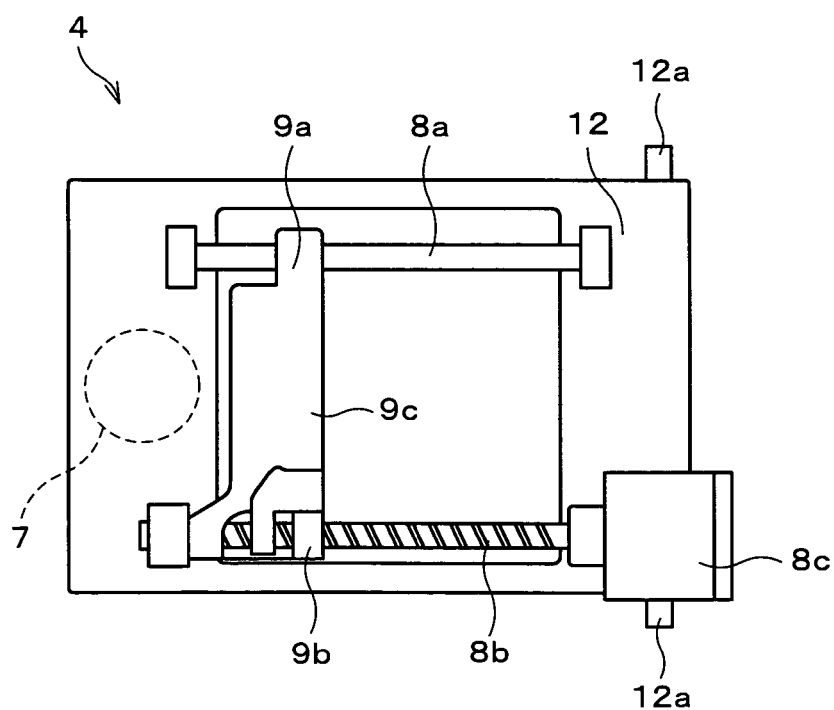
FIG. 13 is a bottom plan view of a traversing mechanism in the disk drive device illustrated in FIG. 10.

The following will describe the fourth embodiment of the present invention with reference to FIGS. 8 and 9.

FIG. 8 is a longitudinal sectional view illustrating a structure of a traversing mechanism 64 in a disk drive device of the fourth embodiment of the present invention, and FIG. 9 is a plan view thereof. This traversing mechanism 64 is similar to the traversing mechanism 54 illustrated in FIGS. 6 and 7, and members having the same functions as those described in the third embodiment are given the same reference numerals and explanations thereof are omitted here. Note that, in this traversing mechanism 64, cleaning means 61 for the optical pickup 29 is provided to the guide mechanism 28 at the outer end provided to extend. The cleaning means 61 is provided with a brush 61a which cleans a lens surface of the optical pickup 29 and a support member 61b which supports the brush 61a, for example.

Therefore, providing the cleaning means 61 enables to make good use of an area which becomes newly necessary for withdrawal of the optical pickup 29 in the present invention to avoid the contact between the optical pickup 29 and the optical disk 22.

Further, the cleaning means 61 may always perform cleaning during disk transport. However, the timing of cleaning is not limited to during the disk transport, and cleaning may be performed when an external request for cleaning is detected and/or when falling of a read signal level (amplitude of a signal, error rate, and others) below a prescribed value that has been set is detected.

During the disk transport, cleaning may be started at the same time when the disk transport mechanism 3 starts the unloading operation of the optical disk 22 after, in response to an external request for unloading the optical disk 22, the spindle motor 27 stops and withdrawal of the optical pickup 29 by the guide mechanism 28 is completed. This makes it possible to put forward a cleaning stop time and complete cleaning before loading of the subsequent optical disk 22, or to perform an early reading/writing of the subsequent optical disk 22, if the cleaning is not completed.

Still further, if it is possible to secure a sufficient length of the guide mechanism 28 provided to extend, the cleaning means 61 may be placed further on the outer side of the position where the optical pickup 29 is withdrawn, so as to independently perform the withdrawal operation and the cleaning operation. In such a case, the cleaning operation is not performed during a normal disk transport, but when the request for cleaning is received and when a level of a read signal drops, the optical pickup 29 may be moved to the cleaning means 61 so as to perform the cleaning operation.

Note that, the above descriptions are based on the assumption that the optical disk 22 is used in a horizontal position. However, as with an optical disk in many disk drive devices, it is needless to say that the optical disk 22 may be used in a longitudinal position.

Specific embodiments or examples implemented in the description of the embodiments only show technical features of the present invention and are not intended to limit the scope of the invention. Variations can be effected within the spirit of the present invention and the scope of the following claims.

What is claimed is:

1. A method for loading and unloading a disk-shaped recording medium in a disk drive device, the disk drive device comprising:
   a pickup which falls below a level where the recording medium is placed when the recording medium is loaded and unloaded, so that the recording medium is loaded and unloaded in a plane direction thereof while avoiding a contact between the recording medium and the pickup;
   a mechanism block which has the pickup mounted thereon, the mechanism block having a free end section located on a turntable side and a base end section located upstream in an unloading direction of the recording medium, wherein when the recording medium is loaded and unloaded, the free end section moves at a distance about the base end section as a swing support point in a thickness direction of the recording medium, thereby realizing the falling; and
   a guide mechanism which guides the pickup substantially in a radial direction of the recording medium to realize recording/readout, the guide mechanism being provided on the mechanism block such that a path of the pickup is parallel to a loading/unloading direction of the recording medium and such that its outer end in the radial direction of the recording medium is provided to extend beyond a periphery of the recording medium,
   the method comprising:
   when the recording medium is loaded and unloaded, causing the pickup to withdraw to the outer end which is provided to extend.

2. A method for loading and unloading a disk-shaped recording medium in a disk drive device, the disk drive device comprising:
   a pickup which falls below a level where the recording medium is placed when the recording medium is loaded and unloaded, so that the recording medium is loaded and unloaded in a plane direction thereof while avoiding a contact between the recording medium and the pickup;
   a mechanism block which has the pickup mounted thereon, the mechanism block having a free end section located on a turntable side and a base end section located upstream in an unloading direction of the recording medium from a diameter line of the recording medium placed at the recording/readout position, the diameter line being orthogonal to the unloading direction, wherein when the recording medium is loaded and unloaded, the free end section moves at a distance about the base end section as a swing support point in a thickness direction of the recording medium, thereby realizing the falling; and
   a guide mechanism which guides the pickup substantially in a radial direction of the recording medium to realize recording/readout, the guide mechanism being provided on the mechanism block such that a path of the pickup is within an area upstream in the unloading direction from the diameter line and such that its outer end in the radial direction of the recording medium is provided to extend beyond a periphery of the recording medium,
   the method comprising:
   when the recording medium is loaded and unloaded, causing the pickup to withdraw to the outer end which is provided to extend.

3. A disk drive device, comprising:
   a pickup which, when a disk-shaped recording medium is loaded and unloaded, falls below a level where the recording medium is placed so that the recording medium is loaded and unloaded in a plane direction thereof while avoiding a contact between the recording medium and the pickup;
   a mechanism block which has the pickup mounted thereon, the mechanism block having a free end section located on a turntable side and a base end section located upstream in an unloading direction of the recording medium, wherein when the recording medium is loaded and unloaded, the free end section moves at a distance about the base end section as a swing support point in a thickness direction of the recording medium, thereby realizing the falling;
   a guide mechanism which guides the pickup substantially in a radial direction of the recording medium to realize recording/readout, the guide mechanism being provided on the mechanism block such that a path of the pickup is parallel to a loading/unloading direction of the recording medium and such that its outer end in the radial direction of the recording medium is provided to extend beyond a periphery of the recording medium; and a control section which, when the recording medium is loaded and unloaded, actuates the mechanism block and controls the guide mechanism, so as to cause the pickup to withdraw to the outer end which is provided to extend.

4. A disk drive device, comprising:

a pickup which, when a disk-shaped recording medium is loaded and unloaded, falls below a level where the recording medium is placed so that the recording medium is loaded and unloaded in a plane direction thereof while avoiding a contact between the recording medium and the pickup;

a mechanism block which has the pickup mounted thereon, the mechanism block having a free end section located on a turntable side and a base end section located upstream in an unloading direction of the recording medium from a diameter line of the recording medium placed at the recording/readout position, the diameter line being orthogonal to the unloading direction, wherein when the recording medium is loaded and unloaded, the free end section moves at a distance about the base end section as a swing support point in a thickness direction of the recording medium, thereby realizing the falling;

a guide mechanism which guides the pickup substantially in a radial direction of the recording medium to realize recording/readout, the guide mechanism being provided on the mechanism block such that a path of the pickup is within an area upstream in the unloading direction from the diameter line and such that its outer end in the radial direction of the recording medium is provided to extend beyond a periphery of the recording medium; and a control section which, when the recording medium is loaded and unloaded, actuates the mechanism block and controls the guide mechanism, so as to cause the pickup to withdraw to the outer end which is provided to extend.

5. A disk drive device which sequentially records/reproduces information on a recording surface of a disk-shaped recording medium, the disk drive device, comprising:

a pickup;

a turntable which rotates the recording medium;

a guide mechanism which moves the pickup substantially in a radial direction of the recording medium while bringing the pickup closer to the recording surface of the recording medium, the guide mechanism being provided such that a path of the pickup is within an area upstream in an unloading direction of the recording medium from a diameter line of the recording medium placed at the recording/readout position, the diameter line being orthogonal to the unloading direction, and such that its outer end in the radial direction of the recording medium is provided to extend beyond a periphery of the recording medium; and a control section which, when the recording medium is loaded and unloaded, controls the guide mechanism so as to cause the pickup to withdraw to the outer end which is provided to extend.

6. The disk drive device according to claim 3, wherein:

in response to an external request for unloading the recording medium, the control section simultaneously performs an operation of slowing down and stopping a spindle motor which rotates the turntable and an operation of causing the guide mechanism to withdraw the pickup, thereafter causing a transport mechanism to unload the recording medium.

7. The disk drive device according to claim 4, wherein:

in response to an external request for unloading the recording medium, the control section simultaneously performs an operation of slowing down and stopping a spindle motor which rotates the turntable and an operation of causing the guide mechanism to withdraw the pickup, thereafter causing a transport mechanism to unload the recording medium.

8. The disk drive device according to claim 5, wherein:

in response to an external request for unloading the recording medium, the control section simultaneously performs an operation of slowing down and stopping a spindle motor which rotates the turntable and an operation of causing the guide mechanism to withdraw the pickup, thereafter causing a transport mechanism to unload the recording medium.

9. The disk drive device according to claim 3, further comprising:

a cleaning section which cleans the pickup, the cleaning section being provided on the outer end of the guide mechanism which is provided to extend.

10. The disk drive device according to claim 4, further comprising:

a cleaning section which cleans the pickup, the cleaning section being provided on the outer end of the guide mechanism which is provided to extend.

11. The disk drive device according to claim 5, further comprising:

a cleaning section which cleans the pickup, the cleaning section being provided on the outer end of the guide mechanism which is provided to extend.

12. The disk drive device according to claim 9, wherein:

in response to an external request for unloading the recording medium, the control section stops a spindle motor which rotates the turntable and causes the guide mechanism to withdraw the pickup, thereafter causing a transport mechanism to unload the recording medium and causing the cleaning section to clean the pickup.

13. The disk drive device according to claim 10, wherein:

in response to an external request for unloading the recording medium, the control section stops a spindle motor which rotates the turntable and causes the guide mechanism to withdraw the pickup, thereafter causing a transport mechanism to unload the recording medium and causing the cleaning section to clean the pickup.

14. The disk drive device according to claim 11, wherein:

in response to an external request for unloading the recording medium, the control section stops a spindle motor which rotates the turntable and causes the guide mechanism to withdraw the pickup, thereafter causing a transport mechanism to unload the recording medium and causing the cleaning section to clean the pickup.

* * * * *